United States Patent
Lawrence et al.

(10) Patent No.: US 8,606,643 B2
(45) Date of Patent: Dec. 10, 2013

(54) LINKING A RETAIL USER PROFILE TO A SOCIAL NETWORK USER PROFILE

(75) Inventors: Sarah Lawrence, Minneapolis, MN (US); Sarah Peterson, Minneapolis, MN (US); Gregory M. Nations, Minneapolis, MN (US); Chad R. Gourley, Elk River, MN (US); Patricia Korth-McDonnell, Brooklyn, NY (US); Joe Stewart, Brooklyn, NY (US)

(73) Assignee: Target Brands, Inc., Minneapolis, MN (US)

(*) Notice: Subject to any disclaimer, the term of this patent is extended or adjusted under 35 U.S.C. 154(b) by 274 days.

(21) Appl. No.: 12/973,865

(22) Filed: Dec. 20, 2010

(65) Prior Publication Data
US 2012/0158539 A1    Jun. 21, 2012

(51) Int. Cl.
G06Q 30/00    (2012.01)

(52) U.S. Cl.
USPC .................... 705/26.1; 705/27.1; 705/319

(58) Field of Classification Search
USPC ........................ 705/26.1, 27.1, 319
See application file for complete search history.

(56) References Cited

U.S. PATENT DOCUMENTS

| | | |
|---|---|---|
| D109,791 S | 5/1938 | Sonin |
| 5,423,139 A | 6/1995 | Feldman |
| 5,644,735 A | 7/1997 | Luciw et al. |
| 5,956,709 A | 9/1999 | Xue |
| D415,483 S | 10/1999 | Decker |
| 6,014,634 A | 1/2000 | Scroggie et al. |
| 6,026,376 A | 2/2000 | Kenney |
| 6,032,130 A | 2/2000 | Alloul et al. |
| 6,055,573 A | 4/2000 | Gardenswartz et al. |
| 6,141,666 A | 10/2000 | Tobin |
| 6,182,871 B1 | 2/2001 | Lam |
| 6,216,139 B1 | 4/2001 | Listou |
| 6,298,330 B1 | 10/2001 | Gardenswartz et al. |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

"Priceless Promotions," by Samantha Murphy, Chain Store Age 84. 10 (Oct. 2008): 58.*

(Continued)

Primary Examiner — Jeffrey A Smith
Assistant Examiner — Anne Georgalas
(74) Attorney, Agent, or Firm — Nixon & Vanderhye P.C.

(57) ABSTRACT

In one example, a private profile page is displayed to a user having a user profile registered with a vendor. In this example, the private profile page includes a list of unviewed products, a product list, and information about a local retail store. As a further example, the user selects a public profile preview function and, in response, the user is presented with a preview of information associated with the user profile. In another example, a social network selection page is displayed to a user having a first profile registered with a vendor. The social network selection page includes a social network selection function for selecting a second profile of the user in a social network. In this example, the user indicates a social network and a second profile registered with the indicated social network is linked to the first profile.

17 Claims, 5 Drawing Sheets

(56) References Cited

U.S. PATENT DOCUMENTS

| | | | |
|---|---|---|---|
| 6,542,927 | B2 | 4/2003 | Rhoads |
| 6,604,681 | B1 | 8/2003 | Burke et al. |
| 6,766,212 | B1 | 7/2004 | Dean |
| 6,965,376 | B2 | 11/2005 | Tani et al. |
| 7,002,573 | B2 | 2/2006 | Trotta et al. |
| 7,010,876 | B1 | 3/2006 | Siegel et al. |
| 7,055,130 | B2 | 5/2006 | Charisius et al. |
| 7,062,453 | B1 | 6/2006 | Clarke |
| 7,263,499 | B2 | 8/2007 | Kunigita |
| 7,284,206 | B2 | 10/2007 | Ozawa et al. |
| 7,409,362 | B2 | 8/2008 | Calabria |
| 7,503,502 | B2 | 3/2009 | Montague |
| D590,412 | S | 4/2009 | Saft et al. |
| 7,529,797 | B2 | 5/2009 | Tseng et al. |
| D599,373 | S | 9/2009 | Kobayashi et al. |
| 7,603,292 | B1 | 10/2009 | Bragg et al. |
| 7,613,687 | B2 | 11/2009 | Nye |
| 7,676,387 | B2 | 3/2010 | Childress et al. |
| 7,702,542 | B2 | 4/2010 | Aslanian, Jr. |
| D619,613 | S | 7/2010 | Dunn |
| D622,280 | S | 8/2010 | Tarara |
| D625,323 | S | 10/2010 | Matsushima et al. |
| D626,133 | S | 10/2010 | Murphy et al. |
| 7,890,378 | B2 | 2/2011 | Clarke et al. |
| 7,996,282 | B1 | 8/2011 | Scott et al. |
| 8,001,003 | B1 | 8/2011 | Robinson et al. |
| D644,663 | S | 9/2011 | Gardner et al. |
| D656,950 | S | 4/2012 | Shallcross et al. |
| 8,244,590 | B2 * | 8/2012 | Rothman .................... 705/26.1 |
| 8,250,145 | B2 * | 8/2012 | Zuckerberg et al. .......... 709/204 |
| 2001/0029465 | A1 | 10/2001 | Strisower |
| 2002/0046105 | A1 | 4/2002 | Gardenswartz et al. |
| 2002/0165799 | A1 | 11/2002 | Jaffe et al. |
| 2003/0014501 | A1 | 1/2003 | Golding et al. |
| 2003/0050848 | A1 | 3/2003 | Defayette et al. |
| 2005/0040230 | A1 | 2/2005 | Swartz et al. |
| 2005/0055321 | A1 | 3/2005 | Fratkina et al. |
| 2005/0081251 | A1 | 4/2005 | Walker et al. |
| 2005/0144093 | A1 | 6/2005 | Kassan |
| 2005/0147054 | A1 | 7/2005 | Loo et al. |
| 2005/0149269 | A1 | 7/2005 | Thomas et al. |
| 2006/0053066 | A1 | 3/2006 | Sherr et al. |
| 2006/0103130 | A1 | 5/2006 | Koivukunnas et al. |
| 2006/0277103 | A1 | 12/2006 | Fujita et al. |
| 2006/0277477 | A1 | 12/2006 | Christenson |
| 2007/0022020 | A1 | 1/2007 | Bernstein |
| 2007/0078850 | A1 | 4/2007 | Aziz et al. |
| 2007/0095615 | A1 | 5/2007 | Spector |
| 2007/0162850 | A1 | 7/2007 | Adler et al. |
| 2007/0192168 | A1 | 8/2007 | Van Luchene |
| 2007/0226189 | A1 | 9/2007 | Piekos et al. |
| 2007/0244883 | A1 | 10/2007 | Bessieres et al. |
| 2007/0244900 | A1 | 10/2007 | Hopkins et al. |
| 2007/0300261 | A1 | 12/2007 | Barton et al. |
| 2008/0005125 | A1 * | 1/2008 | Gaedeke .................... 707/10 |
| 2008/0077487 | A1 | 3/2008 | Davis et al. |
| 2008/0097844 | A1 | 4/2008 | Hsu et al. |
| 2008/0133500 | A1 | 6/2008 | Edwards et al. |
| 2008/0147640 | A1 | 6/2008 | Schachter |
| 2008/0235085 | A1 | 9/2008 | Kovinsky et al. |
| 2008/0255962 | A1 | 10/2008 | Chang et al. |
| 2008/0270248 | A1 | 10/2008 | Brill |
| 2008/0270250 | A1 | 10/2008 | Bolivar et al. |
| 2009/0037355 | A1 | 2/2009 | Brave et al. |
| 2009/0106085 | A1 * | 4/2009 | Raimbeault ................ 705/10 |
| 2009/0106113 | A1 | 4/2009 | Arora et al. |
| 2009/0132388 | A1 | 5/2009 | Omori et al. |
| 2009/0164315 | A1 | 6/2009 | Rothman |
| 2009/0164323 | A1 * | 6/2009 | Byrne ...................... 705/14 |
| 2009/0171812 | A1 | 7/2009 | Fadell |
| 2009/0173792 | A1 | 7/2009 | Montague |
| 2009/0199115 | A1 | 8/2009 | Singh |
| 2009/0265968 | A1 | 10/2009 | McNamee |
| 2009/0273612 | A1 | 11/2009 | Xie |
| 2009/0292599 | A1 | 11/2009 | Rampell et al. |
| 2009/0299965 | A1 | 12/2009 | Aziz et al. |
| 2009/0307100 | A1 | 12/2009 | Nguyen et al. |
| 2010/0114720 | A1 | 5/2010 | Jones et al. |
| 2010/0179876 | A1 | 7/2010 | Holte |
| 2010/0186066 | A1 | 7/2010 | Pollard |
| 2010/0198697 | A1 | 8/2010 | Brown et al. |
| 2010/0223082 | A1 | 9/2010 | Becker et al. |
| 2010/0250336 | A1 | 9/2010 | Selinger et al. |
| 2011/0029368 | A1 | 2/2011 | Hsu et al. |
| 2011/0125569 | A1 * | 5/2011 | Yoshimura et al. ........ 705/14.36 |
| 2011/0153451 | A1 | 6/2011 | Bitz et al. |
| 2011/0173095 | A1 * | 7/2011 | Kassaei et al. ............ 705/26.41 |
| 2011/0225152 | A1 | 9/2011 | Beaudreau et al. |
| 2011/0302498 | A1 | 12/2011 | Gorodyansky |
| 2012/0151383 | A1 | 6/2012 | Kazan et al. |
| 2012/0166945 | A1 | 6/2012 | Roberts et al. |

FOREIGN PATENT DOCUMENTS

| | | |
|---|---|---|
| WO | WO 00/79446 | 12/2000 |
| WO | WO 01/45020 | 6/2001 |
| WO | WO 01/84447 | 11/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

Facebook Adds Profile Preview Feature [Online], Jan. 7, 2010, Retrieved from the Internet at: http://www.allfacebook.com/facebook-adds-profile-preview-feature-2008-09, 5 pages.

Facebook Developers—Facebook Connect, Build and grow with Facebook Connect, [Online] Dec. 18, 2009, Retrieved from the Internet at: http://developers.facebook.com/connect.php, 2 pages.

Muspy, Artists [Online], Jan. 7, 2010, Retrieved from the Internet at: http://www.muspy.com/artists, 2 pages.

Amazon.com Universal Wish List, [Online], Dec. 20, 2010, Retrieved from the Internet at: http://www.amazon.com/b/?ie=UTF8 &node=2223317011&tag=googhydr-20&hvadid=3877744091 &ref=pd_s1_37ck7ovrfc_b, 3 pages.

Huge, Target Patents, Target Patent Annotations, PowerPoint Slides, Mar. 28, 2011, 35 pages.

Maldonado, Robert T., Letter to Gardella, Greg H., Re: Inventor Declarations from HUGE Inventors, Mar. 31, 2011, 2 pages.

Gardella, Greg H., Letter to Robert T. Maldonado, Re: HUGE Inventors for Target Brands, Inc. Patent Applications, Apr. 11, 2011, 5 pages.

Amazon, Prime Eligible Under $25, [Online], Dec. 19, 2009, Retrieved from the Internet at: http://www.amazon.com/s/Znode=2238906011&field%2d erice=%2d2500&p%5f76=1, 4 pages.

A mazon, Recommended for You [Online], Dec. 21, 2009, Retrieved from the Internet at https://www.amazon.com/gp/yourstore?ie=UTF8&ref_=pd%5Firl%5Fgw, 3 pages.

Amazon, Search Results for Columbia 100% Cotton Towels, Retrieved Aug. 10, 2011 from the Internet at: http://www.amazon.com/gp/search/ref=sr_nr_scat_10789941 1n?rh=n%3A10789941%2Ck%3Acott on+bath+towels&keywords=cotton+bath+towels&ie=UTF8&qid=1312572186&scn=10789941&h=5ec5aedf63cc88f6e48fda6b27c85681ae7a2l1ba, 6 pages.

Amazon.com, [Online], Dec. 20, 2010, Retrieved from the Internet at: http://www.amazon.com/gp/wedding/homepage/ref=sv_cm_gft_5, 1 page.

BabiesRus, Baby Gift—Baby Registry at BabiesRus, [Online], Dec. 20, 2010, Retrieved from the Internet at: http://www.toysrus.com/registry/index.jsp, 1 page.

"Bedding & Bath," http://www.kohls.com/kohlsStore/bedandbath/towels/decorativetowels.jsp?bmForm=guided_nav-search&Subcat FolderID=2534374752660882, at least as early as Mar. 29, 2011 (2 pages).

Best Buy, Every Day Laptops, [Online], Dec. 13, 2009, Retrieved from the Internet at: http://www.bestbuy.com/site/Laptop-Computers/Everyday-Laptops, 4 pages.

(56) References Cited

OTHER PUBLICATIONS

BestBuy, Search Results for "i7", Retrieved Aug. 5, 2011 from the Internet at: http://www.bestbuy.com/site/olspage.jsp;jsessionid=9B6687FFBB3C82, 8 pages.
Canon Digital Rebel XT Review (www.dcviews.com, Jul. 4, 2007, 5 pages).
Cohen, Jun., "The Unusually Useful Web Book," New Riders Publishing, Jun. 2003, pp. 113-114.
Office Action from Canadian Patent Application No. 2,761,936, mailed Jul. 16, 2012 (3 pages).
Office Action from Canadian Patent Application No. 145,725 mailed Oct. 1, 2012, 1 page.
Office Action from Canadian Patent Application No. 2,761,936, mailed Nov. 21, 2012 (3 pages).
Office Action from Canadian Patent Application No. 2,761,936, mailed Apr. 18, 2013 (3 pages).
Office Action from Canadian Patent Application No. 2,761,560, mailed Apr. 18, 2013 (3 pages).
Office Action from Canadian Patent Application No. 2,781,784, mailed Nov. 27, 2012 (4 pages).
Office Action from U.S. Appl. No. 12/887,098 dated Mar. 18, 2013.
Office Action from U.S. Appl. No. 12/973,651 dated Jan. 28, 2013.
Crate&Barrel, [Online], Dec. 20, 2010, Retrieved from the Internet at: http://www.crateandbarrel.com/gift-registry/, 1 page.
Cummings, E.E., Poem entitled "i carry your heart with me (I carry it in," [On-line], Poem dated 1920. Retrieved from Internet Jun. 3, 2013, URL:>http://en.wikipedia.org/wiki/E._E._Cummings<. (12 pages, see p. 5).
Eddie Bauer.com, [Online], Dec. 20, 2010, Retrieved from the Internet at: https://www.eddiebauer.com/checkout/bag.jsp?&categoryId=95&categoryName=Sweaters—CARIDIGANS&pCategoryId=3&pCategoryName=Women&gpCategoryId=1&gpCategoryName= EB#ppl=%7Btype%3A%22transition%22%2Censembleld%3A%2236211%22%2CformatStr%3A%22product%22%2CpassedIdObj%3A%7B%22ensembleld%22%3A%2236211%22%7D%2CcategoryId%3A%2227411%22%2CpathInfo%3A%22undefined%, 1 page.
Etihad Airways Home Page, Retrieved Aug. 10, 2011 from the Internet at: http://www.etihadairways.com/sites/etihad/us/en/home/pages/home.aspx?cid=ppc start, 1 page.
Google Product search results for "Canon Powershot", Retrieved Mar. 5, 2010 from the Internet at: http://www.google.com/products?q=canon+powershot&aq=0&oq=canon+, 3 pages.
Grannell, Craig, .net/techniques,/CSS/create a navigation bar, Sep. 2, 2007, 4 pages.
HP Support, Search Results for "HP Pavilion dv7t-1000" / FAQ, Retrieved Mar. 25, 2010 from the Internet at: http://h10061.www1.hp.com/ccsearch/search?pname=HP+Pavilion+dv7t-1000+CTO+Ent, 1 page.
Han, Taedong, Exploring Price and Product Information Search Behavior in e-Market, Proceedings of the International Conference on Information Technology: Coding and Computer, Mar. 2005, 6 pages.
http://www.target.com, Target Brands Inc., Archived on 2009 Jul. 14, retrieved from web.archive.org/web/20090714060557/http://www.target.com, pp. 1-84.
Huddleston, Rob, HTML, XHTML, and CSS: Your Visual Blueprint for Designing Effective Web Pages, Jun. 3, 2008, Wiley Publishing, Inc., pp. 15, 34, 53, 138, 158, 164-165, 173-174, 195, 200, 218, 250-251, 306, 355.
Just-Style: connecting to consumers, [Online], Sep. 16, 2002, Retrieved from the Internet at: http://www.just-style.com/articleprint.aspx?id=93012 on Dec. 19, 2009, 4 pages.
Kalbach, James, "Designing Web Navigation," O'Reilly Media, Aug. 2007, pp. 73-74 and 90.
"Kitchen & Dining," http://www.amazon.com/kitchen-dining-small-appliances-cookware/b?ie=UTF8&node=284507, at least as early as Jan. 28, 2011 (3 pages).
Kohls [Online], Dec. 20, 2010, Retrieved from the Internet at: http://www.kohls.com/upgrade/webstore/home.jsp; jsessionid=3cSgNPpTqV8tRh32vBzDf2q12xQJzpWQjD5Mpnrqlp3wtMX81Psn!-1748685949!105707934, 2 pages.
Kohls, Search Results for "bath towel", Retrieved Aug. 5, 2011 from the Internet at: http://www.kohls.com/upgrade/webstore/home.jsp;jsessionid=2W1QT8, 3 pages.
Lin, Wen-Shan et al., Understanding Consumer Search Activity and Online Purchase Intensions for Improving the Product Recommendation Search, 6th IEEE/ACIS International Conference on Computer and Information Science, Apr. 2007, 6 pages.
Logitech Mouse Home Page, Retrieved Aug. 10, 2011 from the Internet at: http://www.logitech.com/en-us/mice-pointers/mice, 13 pages.
Macys, [Online], Dec. 20, 2010, Retrieved from the Internet at: http://macys.com/registry/wedding/registryhome, 1 page.
Meloni, Julie C., "Sams Teach Yourself HTML and CSS in 24 Hours," $8^{th}$ Ed., Sams Publishing, Dec. 2009, p. 361.
Online Pharmacy for Prescription Drugs—CVS Pharmacy Drug Store [Online], Dec. 21, 2009, Retrieved from the Internet at: http://www.cvs.com/CVSApp/user/home/home.jsp, 2 pages.
Organize com, Kitchen, [Online], Dec. 20, 2009, Retrieved from the Internet at: http://www.organize.com/kitchen.html, 4 pages.
OfficeMax, Laptop Notebook Computers: New Laptop Computers, Wireless Laptop Computers, [Online], Dec. 13, 2009, Retrieved from the Internet at: http://www.officemax.com/technolot/computers/laptop-computers, 3 pages.
Pet, CSN Stores, [Online], Dec. 20, 2009, Retrieved from the Internet at http://www.csnstores.com/Pet-C216358.html, 2 pages.
"Processors-Desktops," http://www.newegg.com/Store/SubCategory.aspx?SubCategory=343&name=Processors-Desktops, at least as early as Dec. 30, 2010 (1 page).
Sam's Club, [Online], Dec. 21, 2009, Retrieved from the Internet at: http://www.samsclub.com/shopping/indexjsp, 3 pages.
Scott, Bill and Neil, Theresa, Designing Web Interfaces, Jan. 19, 2009, O'Reilly Media, Inc., pp. 147-148, 237.
Sony Notebook Home p., Retrieved Aug. 10, 2011 from the Internet at: http://store.sony.com/webapp/wcs/stores/servlet/CategoryDisplay?catalogId=10551&storeId=10151&langId=—1&categoryId=16154&SR=nav:electronics:computers:laptops:shop_compare:ss&ref=http%3A%2F%2Fwww.sony.com%2Findex.php, 5 pages.
Sonystyle, [Online], Dec. 13, 2009, Retrieved from the Internet at: http://www.sonystyle.com/webapp/wcs/stores/servlet/StoreCatalogDisplay?langId=—1&storeId=10151&catalogId=10551&eid=372683003, 2 pages.
Steve Eastman Presentation, Target Managers Meeting, Mar. 15, 2010, 11 pages.
TGT—Target Financial Community Meeting, Jan. 21, 2010, 7 pages.
Tom's Hardware Home Page, Tom's Hardware: Hardware News, Tests and Reviews, Retrieved Mar. 4, 2010 from the Internet at: http://www.tomshardware.com/us4tredirect, 3 pages.
Van Duyne et al., "The Design of Sites: Patterns for Creating Winning Web Sites," $2^{nd}$ Ed., Prentice Hall, Dec. 14, 2006, pp. 677-758.
Walmart, [Online], Dec. 21, 2009, Retrieved from the Internet at: http://www.walmart.com, 2 pages.
Yahoo! Small Business, Effective Navigation Bar Design, [Online], Dec. 21, 2009, Retrieved from the Internet at: http://smallbusiness.yahoo.com/r-pfp-a-40931-m-6-sc-37-effective_navigation_bar design.html, 1 page.
Notice of Allowance dated Sep. 19, 2013 issued in U.S. Appl. No. 12/973,651, 22 pp.
Trend Shop Unveiled by Shop.Com: Shoppers Can 'Get the Look': Premier Products and Brands Featured in Unique Editor Collections and Ensembles, Anonymous. PR Newswire [New York] Oct. 25, 2010. Downloaded from ProQuestDirect on the Internet on Sep. 18, 2013, 2 pages.

\* cited by examiner

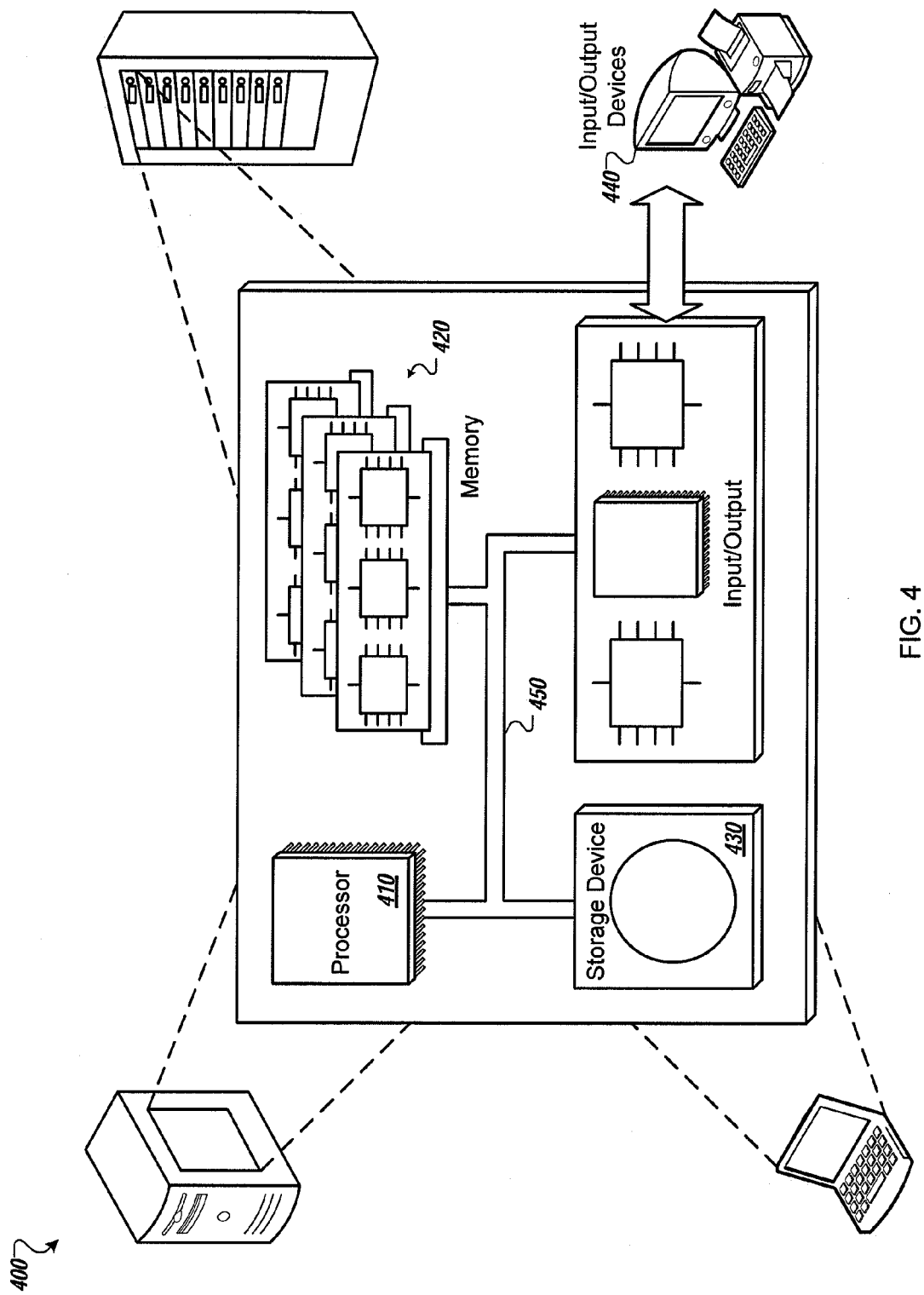

LINKING A RETAIL USER PROFILE TO A SOCIAL NETWORK USER PROFILE

BACKGROUND

Retailing includes the sale of items such as goods, services, and merchandise. The products are often purchased from intermediary distributors and collected for presentation to users. Retail locations include department stores, boutiques, kiosks, malls, and mail order centers. Alternatively or additionally, a retailer can have an Internet-based electronic storefront where images of items are presented for sale. The items, in this case, may be physically located in a warehouse or distribution center.

The Internet is a global system of interconnected computer networks. The Internet consists of private, public, academic, business, and government networks passing data back and forth. The Internet provides a communication pathway between computing devices.

Web pages are documents or resources of information that are often transferred via the Internet and displayed on web browsers. Many web pages are generated using markup language, for example, hypertext markup language (HTML), which is a text based language for describing graphical documents. Web pages are rendered into a graphical user interface for presentation to a user.

A collection of cohesively designed and implemented web pages is sometimes referred to as a web site. A retail web site includes web pages presenting sales items to users. The sales items may be categorized into departments such as the departments commonly found in a brick-and-mortar retail store. The retail web site, in this case, is designed to allow a user to browse departments of the retail web site in a similar manner to browsing departments in a brick-and-mortar store.

Many retail systems use web pages to provide a personalized experience to a user. Some web pages contain dynamic elements for input and output to provide a rich experience to the user. For example, some retail web pages include a function for submitting a user review related to a sale item. Other users can read the submitted user review to learn more information regarding the item. Another example of a dynamic element includes a control for changing the presentation of the information on a particular web page. If a web page includes multiple sales items, for example, controls can be provided to the user for rearranging the items by price, popularity, or brand.

SUMMARY

In one example, a private profile page is displayed to a user having a user profile registered with a vendor. In this example, the private profile page includes a list of unviewed products, a product list, and information about a local retail store. As a further example, the user selects a public profile preview function and, in response, the user is presented with a preview of information associated with the user profile. In this example, the public profile preview page represents the apperance of the user's public profile as it appears to other users. In another example, a social network selection page is displayed to a user having a first profile registered with a vendor. The social network selection page includes a social network selection function for selecting a second profile of the user in a social network. In this example, the user indicates a social network and a second profile registered with the indicated social network is linked to the first profile. The details of one or more implementations are set forth in the accompanying drawings and description below. Other features, objects, and advantages will be apparent from the description and drawings, and from the claims.

DESCRIPTION OF DRAWINGS

FIG. 4 is a block diagram of a computing system optionally used in connection with computer-implemented methods described in this document.
Like reference symbols in various drawings indicate like elements.

DETAILED DESCRIPTION OF ILLUSTRATIVE IMPLEMENTATIONS

Figure 1:
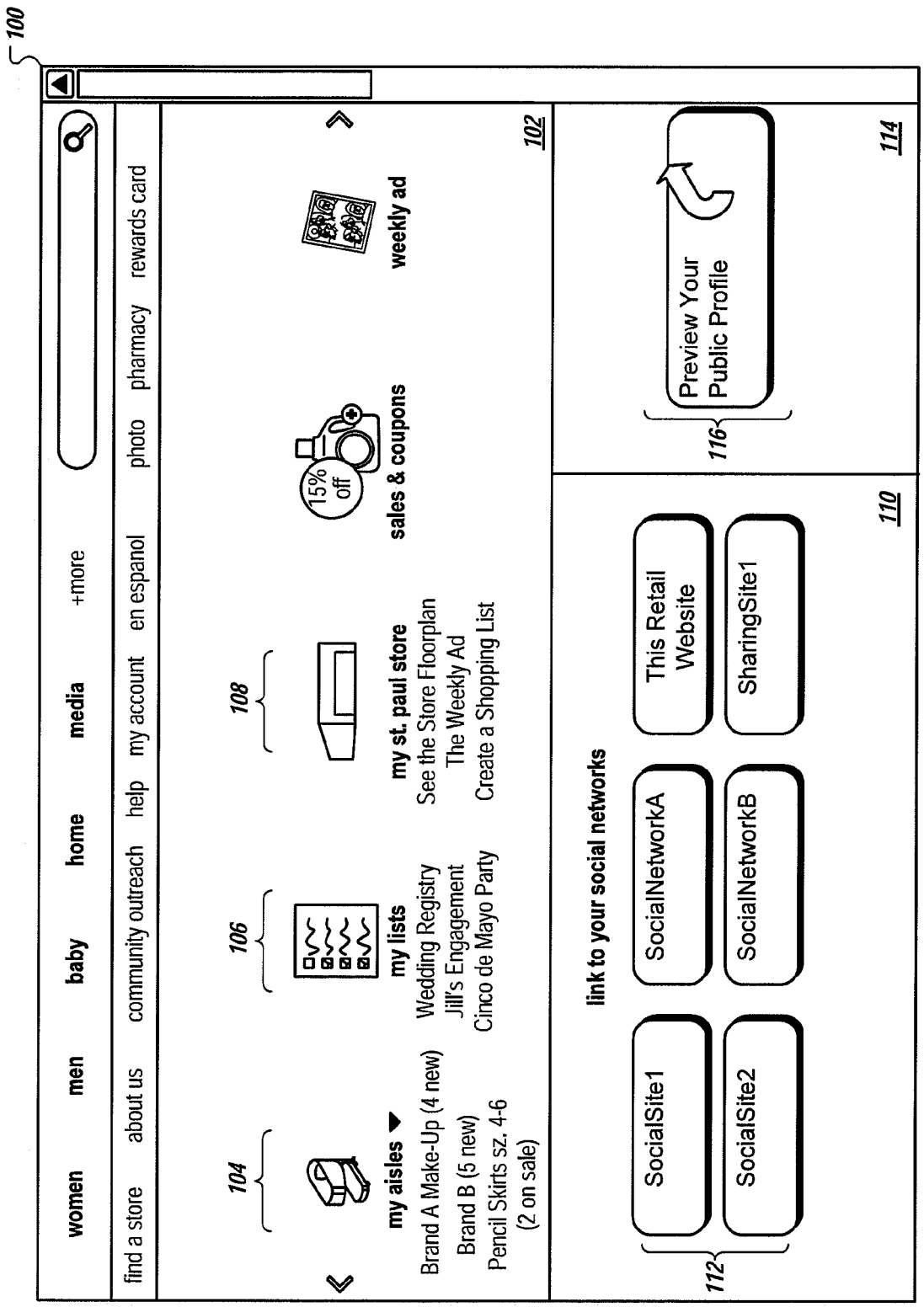
FIG. 1 shows an example retail web page.

FIG. 1 shows an example retail web page 100 of a retail web site associated with a vendor. The retail web page includes graphic elements, for example, to display user profile information and receive input from a user having a profile registered to the retail web site. The retail web page 100 includes content that is tailored to the viewer of the retail web page 100. Web pages and web sites are described in the following examples, and it will be understood that any other computer-presentable page or document is optionally used, for example an Internet page or a cell phone screen.

A private profile display 102 contains interactive elements presented to a particular user to facilitate the user's retail experience. Some of the interactive elements of the private profile display 102 are formatted and/or contain content specifically for the particular user. The formatting and/or content are associated with a user account.

Lists of unviewed products 104 contain navigation links to web pages displaying products that have not been seen or reviewed by the user. For example, as the retail web site receives information about new inventory, the new inventory is compared to the product types or product categories associated with the lists of unviewed products 104, and any matching inventory is added to one or more lists. Similarly, as the retail web site receives information about promotional inventory (e.g., products included in a sales promotion), the promotional inventory is compared to the product types or product categories associated with the lists of unviewed products 104 and any matching inventory is added to one or more lists. Individual products in the lists of unviewed products 104, in some implementations, are marked with an indication regarding the status (e.g., new, on sale, clearance item, etc.) of each product. In some implementations, the lists include summations of the number of unviewed products and the number of promotional products contained within the respective list. In some examples, the user manually selects the types of products in the lists of unviewed products 104. In some examples, the types of products in the lists of unviewed products 104 are deteremined based on the user's purchase history, comment history, and/or the activities of the user's social contacts.

Product lists 106 contain navigation links to web pages displaying a list or grouping of products. The products in one of the product lists 106 are identified by one or more users and/or the web site, optionally around a central theme or social event. For example, the user creates a registry list for a wedding, baby shower, or birthday and the registry list contains items the user would like to receive at that event. In another example, the user subscribes to a product list, such as a gift registry, created by another user such as one of the user's social contacts. In a third example, the retail web site generates a wishlist for the user based on the browsing history of the user and/or the user's social contacts.

Local store information 108 contains navigation links to web pages displaying information about one or more retail store locations that the user visits. For example, a navigation link to a local store's floor plan leads to a static image, an interactive web page, and/or to a command to send the floor plan to the user's mobile device. In another example, a navigation link to a local store's sales promotion leads to a document or web page showing items that are on sale, clearance, newly arrived, in season, and/or otherwise promoted. In a third example, a navigation link to a shopping list creator leads to a utility for creating a shopping list based on products available at the retail store location. The location associated with the local store information 108, in some implementations, is based upon user profile data, such as home address.

A social network selection display 110 contains interactive elements 112, such as buttons, controls, selection functions, or navigation links presented to a user for linking the user's profile at the retail web site with profiles in social networks. The interactive elements 112, for example, initiate communication between the retail web site and a system managing a social network. In some examples, one or more interactive elements 112 link the user's profile with one or more social networks managed by the retail web site. Social network profile information, for example, is provided to the retail server from the selected social network in response to a retail server request. After selection of one of the interactive elements 112, in some implementations, the retail server replaces the web page 100 or a portion thereof (e.g., the private profile display 102) with a revised private profile page, generated in response to associating the social network profile with the user profile registered to the retail web site. The revised private profile page, for example, includes information derived through the association of the social network profile with the user profile at the retail web site.

In some implementations, the behavior and result of the interactive elements 112 differ, such as by being determined by the communication protocol and requirements of the individual social networks. For example, a first social network allows the retail web site to establish a new user profile on behalf of the user (e.g., based upon personal information derived from the private profile information registered to the retail web site). A second social network, for example, requires authentication of a user, such as input of a user password, prior to providing social network profile information to the retail server.

A public profile preview display 114 contains an interactive element 116, such as a button, control, selection function, or navigation link presented to a user for previewing the user's public profile. The public profile preview, accessible through the interactive element 116, is used by the user, for example, to verify that the user's public profile information is, being presented correctly and in a complimentary format. In this example, the interactive element 116 is a button that, when activated, launches a pop up window that displays the user's public profile as it appears to other users. For example, the user's public profile is displayed with public comments that the user has made in other web pages of the retail web site or other user information that is accessible to other users upon searching for the user in the retail web site.

In other example retail web sites, other configurations are possible. For example, a web site includes a first web page containing the private profile display 102 and a second web page containing the social network selection display 110. In another example, a web site includes a web page containing both the private profile display 102 and a public profile display.

Figure 2:
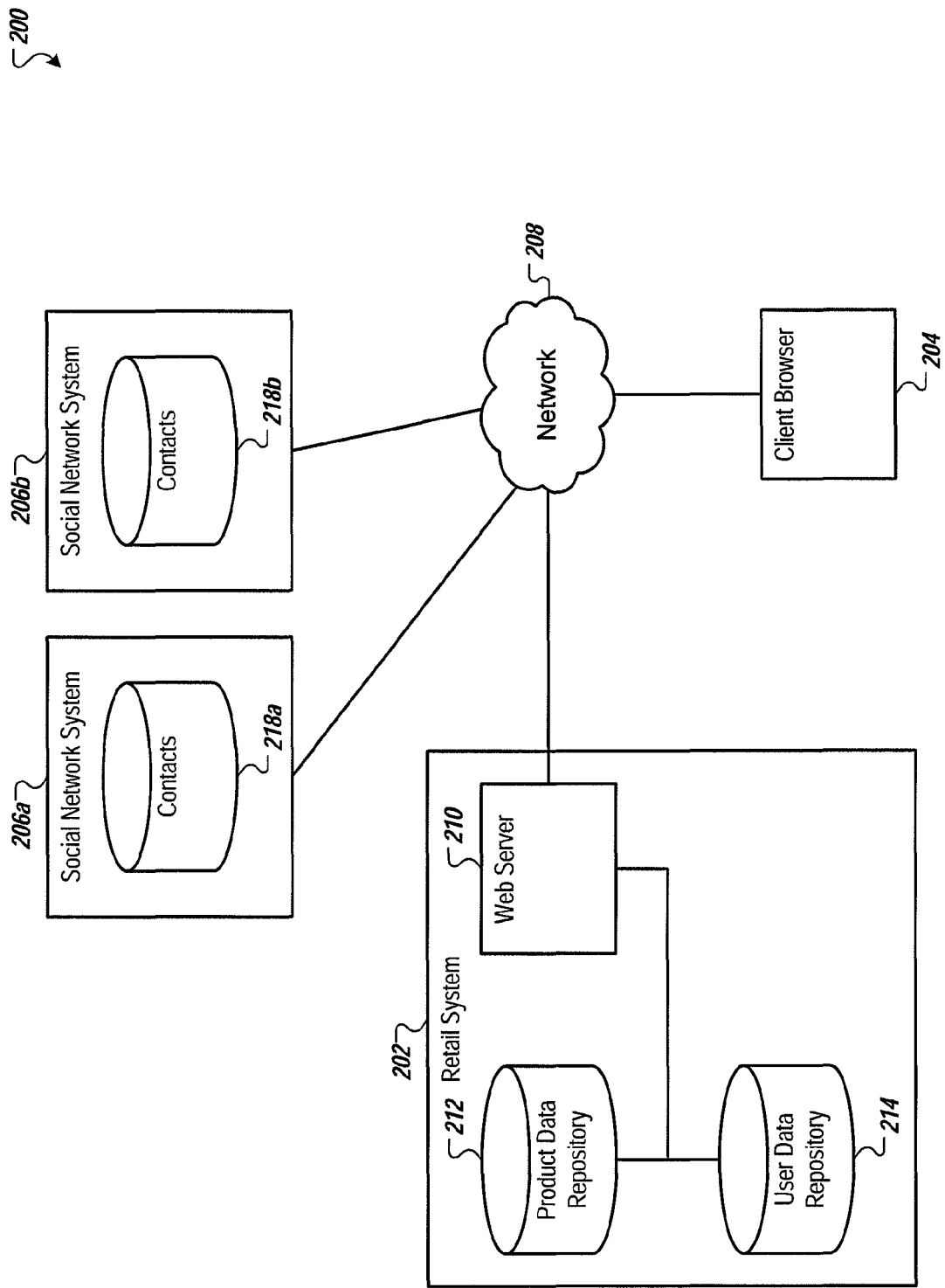
FIG. 2 shows an example system for serving retail web pages.

FIG. 2 shows an example system 200 for serving retail web pages associated with a retailer. The system 200 is used, for example, to serve web pages that contain private profile pages, social network selection pages, and/or public profile previews individualized to a customer registered with the retailer (e.g., through a retail web site). The system 200 includes a retail system 202 to generate web pages, a client browser 204 to display web pages, and third party social structure systems 206a, 206b to store user data.

The retail system 202 includes a web server 210. The web server 210 serves content such as web pages, documents, and files. The web server 210 delivers data through various protocols including, in some examples, hyper text transfer protocol (HTTP) and file transfer protocol (FTP). A product data repository 212 stores details about items, such as price, name, category, and an image of each item. A user data repository 214 stores account data about customer accounts, such as name, address, billing information, lists of unviewed items, item categories of interest, product lists, associated retail store locations, and associated social account information. In some examples, the lists of unviewed items are lists of references to item data entries in the product data repository 212.

The client browser 204 is a web browser for retrieving, presenting, and traversing information resources, including those served by the web server 210 of the retail system 202. The client browser 204 receives web pages, documents, and files which are rendered and/or displayed for a user.

The third party social structure systems 206a and 206b receive, organize, store, and serve social data about users. The third party social structure systems 206a, 206b, in this example, include respective contacts 218a and 218b and a mapping of social relationships between the contacts 218a, 218b. In some implementations, at least one of the third party social structure systems 206a, 206b is owned or operated by, or otherwise under the control of, the retail system 202. In some examples, the retail system 202 organizes and indexes users by their social relationships (e.g., by user-identified friends, users with similar shopping or browsing habits, users in similar geographic locations, etc). In some examples, the retail system 202 matches customer data with the contacts 218a, 218b supplied by one of the third party social structure systems 206a, 206b operated by a different business entity.

A network 208 is a system that passes data and/or communications between systems. The network 208 optionally includes the Internet, local area networks, wireless networks, and cellular data networks.

When a customer accesses the retail system 202 through the network 208, using the client browser 204, the web server 210 serves a customer account page initialized to display a private account page generated using information associated with an account the customer has registered with the retail system 202. The private account page includes a list of one or more unviewed items available from the retail system 202. The unviewed items, for example, include information from the product data repository 212, such as an image of the item or a description of the item. The list of unviewed items is generated by the retail system 202 from items included in a first item category. The private account page includes a floor plan link to a floor plan of a retail store local to the customer, a promotion link to a sales promotion, and a shopping list link providing the customer with a method for creating a shopping list of items available at the retail store local to the customer. The private account page also includes a social network selection function, such as a button or navigation link configured to provide customer data to one of the third party social structure systems 206a, 206b. In some implementations, individual social network selection functions are provided for each of the third party social structure systems 206a, 206b. Additionally, the private account page includes a public account preview function configured to display, upon selection, a preview of customer data associated with the customer account.

In some implementations, the private account page is generated after the customer has specified, using a different web page, an item category. The specified item category, for example, is visible within the private account page as one of the lists of unviewed items. The list of unviewed items includes, for example, new items recently added for sale by the retailer and promotional items having a promotion applied by the retailer.

The user, interacting with the private account page through the client browser 204, selects the public account preview function. The web server 210 receives this customer input and generates a public account preview, for example, portrayed in the same browser window or in a pop-up window. The public account preview displays information about the customer as viewed by other users of the retail system 202. In some examples, the information includes reviews created by the customer, the neighborhood (e.g., zip code, local store address, etc.) of the customer, and an image of the customer.

In another example, the user selects a social network selection function. The web server 210, upon receiving this customer input through the network 208, communicates customer data to one of the third party social structure systems 206a, 206b. In response, the selected third party social structure system 206a, 206b provides account information regarding an account with the selected third party social structure system 206a, 206b registered to the customer. If no account was registered to the customer at the time when the web server 210 provided the customer data, in some implementations, the selected third party social structure system 206a, 206b, using the customer data provided by the retail system 202, registers a new social account on behalf of the customer. If, instead, an account registered to the customer is located by the selected third party social structure system 206a, 206b, in some implementations, the customer is invited by the selected third party social structure system 206a, 206b, via the retail system 202, to provide validation information or authorization to release account information to the retail system 202. The selected third party social structure system 206a, 206b provides social account information to the retail system 202. The retail system 202 associates the social account information with the customer account. For example, the social account information is linked with the customer account information in the user data repository 214.

In some implementations, after the retail system 202 associates the social account information with the customer account, the retail system 202 generates a revised private account page, including information pertaining to the social account and provides the revised private account page to the client browser 204. For example, the web page that the customer is currently viewing is updated or the customer is redirected to a newly generated web page including the revised private account page.

Figure 3A:
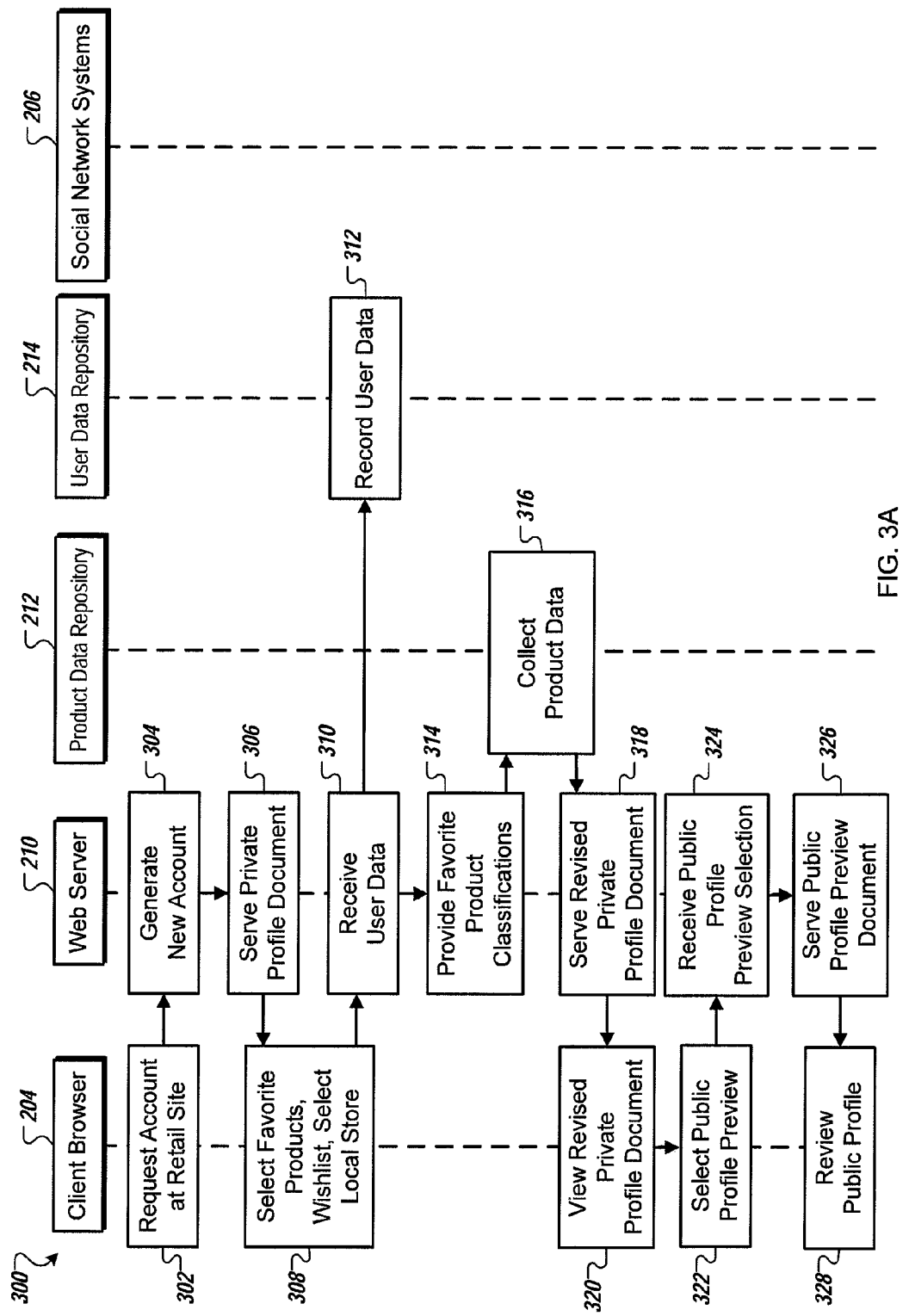
FIGS. 3A and 3B are swim lane diagrams of example methods of serving retail web pages.
Figure 3B:
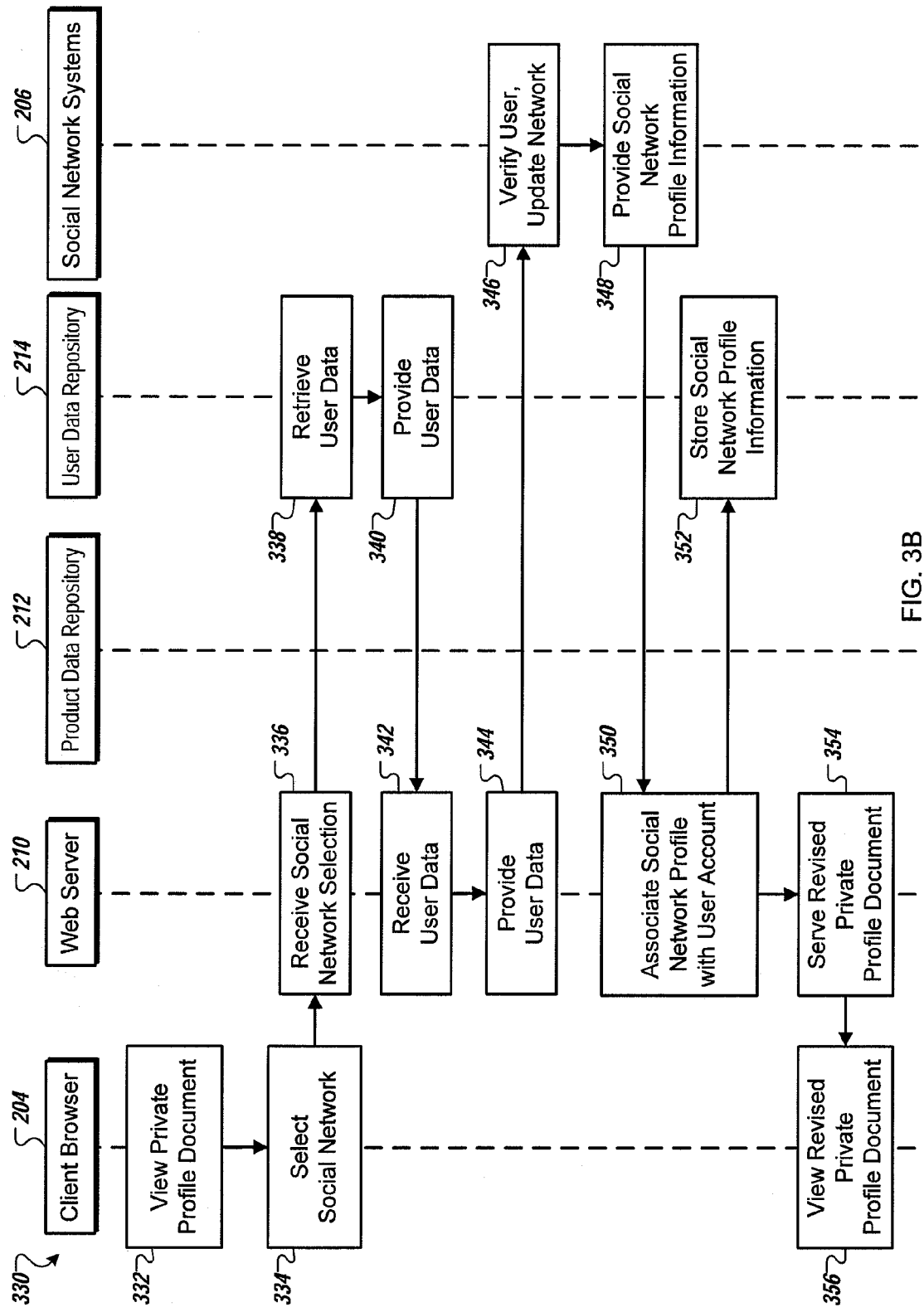

FIGS. 3A and 3B are swim lane diagrams of example methods of serving retail web pages. The methods are used to serve web pages that contain private user data documents, social network selection documents, and/or public user data preview documents. The served web page includes content that is tailored to the viewer of the retail web page.

As shown in FIG. 3A, an example method 300 illustrates the generation of a user account with the web site of an organization, followed by adding user data to the new user data set registered to the web site. The client browser 204 browses to the web site of an organization, such as a retail web site, and requests an account at the retail web site (302). For example, the user is making a purchase and wishes to make future purchases or join a social network associated with the retail web site.

The web server 210 generates a new account (304) for the user, collecting information from the user such as user name and password. The web server 210 generates and serves a private user data document (306), optionally populated with some default information or with some areas indicating a request for user input. The user, through the client browser 204, selects one or more favorite product classifications, creates a wishlist, and selects a local retail store (308) that is associated with the retail web site. The web server 210 receives the user data (310) and transfers the user data to the user data repository 214, where it is recorded (312).

The web server 210 provides the favorite product classifications, specified by the user, to the product data repository 212 (314). The product data repository 212 collects product data matching the product classification (316) and provides the collected product data to the web server 210. In some examples, the product data repository 212 collects new products (e.g., added to the inventory in the last two weeks, etc.) and promotional products (e.g., products on sale or on clearance) classified under the provided product classification(s).

The web server 210 serves a revised private user data document (318) including a list of one or more unviewed products as provided by the product data repository 212. The revised private user data document also includes a public user data preview control, selectable to preview a user data set document as displayed to another user of the retail web site.

The user views the revised private user data document (320) through the client browser 204 and selects (322) the public user data preview control. The web server 210 receives the user input associated with the public user data preview control selection (324). In response, the web server 210 serves a public user data preview document (326) to the client browser 204.

At the client browser 204, the user reviews the public user data preview document (328). In some implementations, the public user data preview document replaces the private user data document (e.g., in the same window). In other implementations, the public user data preview document is displayed as a pop-up window or in a separate window of the client browser 204. The public user data preview document, in some examples, contains a user name, a user image, and one or more product reviews written by the user. If the user is not pleased with the public user data preview document, in some implementations, the user changes the type of information displayed or the method in which the public user data is displayed using the private user data document. For example, the user selects whether to make a full name public or to use a screen name.

As shown in FIG. 3B, an example method 330 illustrates the association of the user account with a user data set registered with a social network site. The method 330, for example, is executed at some time in the future from the method 300.

The user, at the client browser 204, views the private user data document (332). The private user data document includes one or more social network selection controls for selecting a social network user data of the user, registered to a social network site. The user selects a social network through the social network selection control (334).

The web server 210 receives the user input regarding the selection of the social network (336) and retrieves user data from the user data repository (338). The user data, for example, includes information such as email address, full name, or screen name for use as identification with the social network site. The user data repository 214 provides the user data (340) to the web server 210. In other implementations, the web server 210 prompts the user, at the client browser 204, for identification data to use with the social network system(s) 206.

Upon receipt of the user data (342), the web server 210 provides user data (344) to the social network system(s) 206 to identify the user. The social network system(s) 206 verify the user and, optionally, update the network (346). In some implementations, the social network system(s) 206 associate the retail account user data with the social network user data. If no user account matching the provided user data exists, in some implementations, the social network system(s) 206 generate a new social network user data for the user and update the social network with the new account information. The social network system(s) 206 then provide social network user data information (348) to the web server 210.

The web server 210 associates the social network user data with the user account (350) and provides the social network user data information to the user data repository 214. The user data repository 214 stores the social network user data information (352). For example, the user data repository 214 links the social network user data information to the user data.

The web server 210 serves a revised private user data document (354) to the client browser 204. The revised private user data document, for example, includes information regarding the registration of the user with the social network system(s) 206. The user views the revised private user data document (356) at the client browser 204.

FIG. 4 is a schematic diagram of a generic computer system 400. The system 400 is optionally used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 is optionally a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A computer implemented method for serving web pages, the method comprising:
serving, from a retail server including a processor to a client computing device, a private profile page including information about a user registered with a vendor, the private profile page defining a first profile of the user the serving step comprising:
providing with the processor a social network selection function that enables the user to select a social network from a plurality of social networks, and
providing with the processor a public profile preview function and displaying a preview of information associated with the first profile upon selection of the public profile preview function;
receiving a first user input from the client computing device, wherein if a second profile of the user exists in one or more of the plurality of social networks, the first user input comprising a social network selection from the plurality of social networks in response to the user activating the social network selection function in the private profile page, and wherein if the second profile of the user does not exist in one of the plurality of social networks, the first user input activating the social network selection function for the processor to create the second profile with a selected one of the plurality of social networks;
the processor forwarding, in response to the first user input, user data for the user to the social network;
the processor receiving, from the social network, social network profile information regarding the second profile; and
the processor associating the first profile with the second profile in response to receiving the social network profile information.

2. The method of claim 1, wherein the private profile page further comprises a list of one or more unviewed products available from the vendor and selected for the user, the products belonging to a first product type, and the list including at least one of new products added for sale by the vendor and promotional products having a promotion applied by the vendor, the method further comprising receiving a second user input specifying the first product type.

3. The method of claim 1, wherein the private profile page further comprises at least one of a floor plan link to a floor plan of a retail store associated with the user, a promotion link to a sales promotion from the vendor, and a shopping list link operable upon selection to cause the creation of a shopping list.

4. The method of claim 1,
wherein the social network selection function provides two or more options to the user to select the second profile, the options including two or more third party social network sites; and
wherein the second profile is registered to the social network prior to the forwarding.

5. The method of claim 4, further comprising, after the user selects the second profile, serving a revised private profile page to the user, wherein the revised private profile page includes user information from the second profile.

6. The method of claim 1, further comprising:
receiving a third user input activating the public profile preview function;
generating a public profile preview of the first profile; and
revising the private profile page to be a revised private profile page that includes the public profile preview and serving the revised private profile page.

7. A system including a computer processor, the system comprising: a graphical user interface generated by the computer processor for a retail environment, the graphical user interface including:
a customer account page initialized to display a private account page including data about a customer registered with a retailer, the private account page defining a first account of the customer, the private account page comprising:
a first control operable upon selection by the customer to select a third party social structure service from a plurality of third party social structure services and to cause operations including
if a second account of the user exists in one of the plurality of third party social structure services, forwarding the customer data to the selected third party social structure service, the customer data used by the selected third party social structure service to identify and select the second account of the customer,
if the second account of the user does not exist in one of the plurality of third party social structure services, the first customer input activates the first control to create the second account with the selected third party social structure service, the second account not being registered to the selected third party social structure service prior to activating the first control, wherein the customer data is used by the selected third party social structure service to create the second account,
receiving, from the selected third party social structure service, social account information regarding the second account, and
associating the first account with the second account in response to receiving the social account information, and
a second control operable upon selection to cause the display of a preview of information associated with the first account,
wherein the customer account page is updated within the graphical user interface to display a revised private account page in response to the selection of the second account of the customer and the displayed preview.

8. The system of claim 7,
wherein the private account page further comprises a list of one or more unviewed items available from the retailer and selected for the customer,
the unviewed items belonging to a first item category, and
the list including at least one of new items added for sale by the retailer and promotional items having a promotion applied by the retailer; and
wherein the graphical user interface displays the private account page responsive to a second customer input specifying the first item category.

9. The system of claim 7, wherein the private account page further comprises at least one of a floor plan link to a floor plan of a retail store associated with the customer, a promotion link to a sales promotion from the retailer, and a shopping list link selectable to create a shopping list.

10. The system of claim 7, wherein
the first control provides two or more options to the customer to select the second account, the options including two or more third party social networks, and
the first customer input activates the first control to select the second account among multiple social accounts of the customer, the third party social structure service having registered the second account for the customer prior to the first customer input.

11. The system of claim 7, wherein the first customer input activates the second control, and wherein the preview of information associated with the first account is generated and included in the revised private account page.

12. A non-transitory computer-readable medium having recorded therein instructions for performing a method for serving web pages, the method comprising:
serving a private user data document including information about a user registered with an organization, the private user data document defining a first user data set of the user, the serving step comprising:
providing a social network selection control that enables the user to select a social network site from a plurality of social network sites, and
providing a public user data preview control and displaying a preview of information associated with the first user data set upon selection of the public user data preview control;
receiving a first user input, wherein if a second user data set of the user exists in one or more of the plurality of social network sites, the first user input comprising a social network site selection from the plurality of social network sites in response to the user activating the social network selection control in the private user data document, and wherein if the second user data set of the user does not exist in one of the plurality of social network sites, the first user input activating the social network selection function to create the second user data set with a selected one of the plurality of social network sites;
forwarding, in response to the first user input, user data for the user to the social network site;
receiving, from the social network site, social network user data information regarding the second user data set; and
associating the first user data set with the second user data set in response to receiving the social network user data information.

13. The computer-readable medium of claim 12,
wherein the private user data document further comprises a list of one or more unviewed products available from the organization and selected for the user,
the products belonging to a first product classification, and
the list including at least one of new products added for sale by the organization and promotional products recently having a promotion applied by the organization; and
wherein the method further comprises receiving, prior to serving the private user data document, a second user input specifying the product classification.

14. The computer-readable medium of claim 12, wherein the private user data document further comprises at least one of: a floor plan link to a floor plan of a retail store associated with the user, a promotion link to a sales promotion from the organization, and a shopping list link to create a shopping list.

15. The computer-readable medium of claim 12,
wherein the social network selection control provides two or more options to the user to select the second user data set, the options including two or more third party social structure systems; and
wherein the second user data set is registered to the social network site prior to the forwarding.

16. The computer-readable medium of claim 15, wherein the method further comprises, after the user selects the second data set, serving a revised private user data document to the user, wherein the revised private user data document includes user information from the second data set.

17. The computer-readable medium of claim 12,
wherein the first user input activates the public user data preview control; and
wherein the method further comprises:
receiving a third user input activating the public user data preview control,
generating a public profile preview of information associated with the first user data set, and
revising the private user data to be revised private user data that includes the public profile preview and serving the revised private user data document including the public profile preview.

* * * * *